(12) United States Patent
Lamboley et al.

(10) Patent No.: US 10,907,954 B2
(45) Date of Patent: Feb. 2, 2021

(54) METHODS AND SYSTEMS FOR MEASURING DIMENSIONS OF A 2-D OBJECT

(71) Applicant: Hand Held Products, Inc., Fort Mill, SC (US)

(72) Inventors: Thierry Lamboley, Escatalens (FR); Frederic Bordenave, Mezerville (FR); Thomas Kasprzyk, Haute Garonne (FR)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 200 days.

(21) Appl. No.: 16/146,175

(22) Filed: Sep. 28, 2018

(65) Prior Publication Data

US 2020/0103218 A1    Apr. 2, 2020

(51) Int. Cl.
   *G01B 11/02* (2006.01)
   *G06T 7/13* (2017.01)
   *G06T 7/521* (2017.01)

(52) U.S. Cl.
   CPC ............. *G01B 11/02* (2013.01); *G06T 7/13* (2017.01); *G06T 7/521* (2017.01); *G06T 2207/10028* (2013.01)

(58) Field of Classification Search
   CPC . G01B 11/02; G06T 2207/10028; G06T 7/13; G06T 7/521; G06T 2207/30108; G06T 7/12; G06T 7/62
   USPC ........................................... 356/634
   See application file for complete search history.

(56) References Cited

U.S. PATENT DOCUMENTS

| 4,647,208 | A | * | 3/1987 | Bieman | G01B 11/00 348/94 |
| 6,402,707 | B1 | * | 6/2002 | Ernst | A61B 5/1076 600/590 |
| 9,602,796 | B2 | | 3/2017 | Chandra et al. | |
| 2010/0238271 | A1 | * | 9/2010 | Pfeiffer | G01B 5/20 348/46 |
| 2014/0351073 | A1 | | 11/2014 | Murphy et al. | |

(Continued)

OTHER PUBLICATIONS

Luciano Spinello, et al., People Detection in RGB-D Data, Sep. 25, 2011, Proceedings of 2011 IEEE/RSJ International Conference on Intelligent Robots and Systems, 6 pages.

(Continued)

*Primary Examiner* — Sunghee Y Gray
(74) *Attorney, Agent, or Firm* — Alston & Bird LLP

(57) ABSTRACT

Various embodiments disclose a dimensioner apparatus including a projector configured to project structured light in a field of view of the dimensioner apparatus, a first image capturing device configured to capture a first structured light image of the field of view, and a processor configured to analyze the first structured light image to identify a hole region in the first structured light image. The hole region in the first structured light image indicates a presence of a structured light absorbing platform that absorbs the projected structured light. Further, the processor is configured to operate the dimensioner apparatus in a two-dimensional (2-D) mode based on the identification of the hole region. The dimensioner apparatus, in the 2-D mode, is configured to determine one or more dimensions of a 2-D object placed on the absorbing platform.

6 Claims, 8 Drawing Sheets

(56) References Cited

U.S. PATENT DOCUMENTS

| | | | |
|---|---|---|---|
| 2017/0054965 A1* | 2/2017 | Raab | G01C 11/02 |
| 2017/0064280 A1* | 3/2017 | Cho | G06K 9/4604 |
| 2017/0337705 A1* | 11/2017 | Bendall | G06T 7/0004 |
| 2018/0240241 A1* | 8/2018 | Armstrong | G06T 7/593 |
| 2019/0196493 A1* | 6/2019 | Xiong | G05D 1/0238 |
| 2019/0258225 A1* | 8/2019 | Link | G06T 19/20 |
| 2019/0392595 A1* | 12/2019 | Uhlenbrock | G06T 3/0068 |
| 2020/0258247 A1* | 8/2020 | Lasserre | G06T 7/529 |

OTHER PUBLICATIONS

Allison Janoch, et al., A Category-Level 3-D Object Dataset: Putting the Kinect to Work, Nov. 6, 2011, Proceedings of 2011 IEEE International Conference on Computer Vision Workshops (ICCV Workshops), 7 pages.

\* cited by examiner

METHODS AND SYSTEMS FOR MEASURING DIMENSIONS OF A 2-D OBJECT

BACKGROUND

Applicant has identified a number of deficiencies and problems associated with conventional dimensioner apparatus. Through applied effort, ingenuity, and innovation, many of these identified problems have been solved by developing solutions that are included in embodiments of the present disclosure, many examples of which are described in detail herein.

BRIEF SUMMARY

Exemplary embodiments of the present disclosure relate generally to a dimensioner apparatus and, more particularly, to methods, systems, and apparatuses for operating the dimensioner apparatus to determine one or more dimensions of the two-dimensional (2D) object.

Various embodiments illustrated herein disclose a method for operating a dimensioner apparatus. The method includes causing, by a processor, a projector to project structured light in a field of view of the dimensioner apparatus. Further, the method includes causing, by the processor, a first image capturing device to capture a first structured light image of the field of view of the dimensioner apparatus. Furthermore, the method includes analyzing, by the processor, the first structured light image to identify a hole region in the first structured light image. The hole region in the first structured light image indicates a presence of a structured light absorbing platform in the field of view that absorbs the projected structured light. Additionally, the method includes determining, by the processor, one or more dimensions of the hole region in the first structured light image. The determined dimensions are thereafter compared with at least one dimension threshold. Based on the comparison, the dimensioner apparatus is operated in a two-dimensional (2-D) mode. The dimensioner apparatus, in the 2-D mode, is configured to determine one or more dimensions of a 2-D object placed on the structured light absorbing platform.

In some examples, the method further includes determining a 3D point cloud based on the first structured light image.

In some examples, the method further includes receiving, by the processor, an input defining a reference plane in the field of view of the dimensioner apparatus. Further, the method includes determining one or more dimensioner parameters based on the reference plane.

In some examples, the one or more dimensioner parameters include at least one of a height of the dimensioner apparatus from the reference plane and an angle of the dimensioner apparatus with respect to a stand on which the dimensioner apparatus is mounted.

In an example embodiment, the method further includes causing, by the processor, the first image capturing device to capture a second structured light image of the field of view, wherein the method further includes determining another a 3-D point cloud based on the second structured light image. The other 3D point cloud is representative of the 2-D object placed on the structured light absorbing platform.

In an example embodiment, the method of claim further includes identifying, by the processor, one or more 3D points from the other 3-D point cloud corresponding to the at least one 2-D object, wherein the one or more points define a periphery of the 2-D object. Furthermore, the method includes determining, by the processor, the one or more dimensions of the 2-D object based at least in part on a count of the one or more identified 3D points.

Various embodiments illustrated herein disclose a dimensioner apparatus comprising a projector configured to project structured light in a field of view of the dimensioner apparatus. Further, the dimensioner apparatus includes a first image capturing device configured to capture a first structured light image of the field of view. Additionally, the dimensioner apparatus includes a processor communicatively coupled to the projector and the first image capturing device. The processor is configured to analyze the first structured light image to identify a hole region in the first structured light image, wherein the hole region in the first structured light image indicates a presence of a structured light absorbing platform in the field of view that absorbs the projected structured light. Further, the processor is configured to operate the dimensioner apparatus in a two-dimensional (2-D) mode based on the identification of the hole region. The dimensioner apparatus, in the 2-D mode, is configured to determine one or more dimensions of a 2-D object placed on the absorbing platform.

In an example embodiment, the processor is further configured to determine a 3D point cloud from the first structured light image.

In an example embodiment, the processor is further configured to receive an input defining a reference plane in the field of view of the dimensioner apparatus, wherein the processor is configured to determine one or more dimensioner parameters based on the defined reference plane.

In an example embodiment, the one or more dimensioner parameters comprise at least one of a height of the dimensioner apparatus from the reference plane and an angle of the dimensioner apparatus with respect to a stand on which the dimensioner apparatus is mounted.

In an example embodiment, the processor is further configured to determine one or more dimensions of the hole region.

In an example embodiment, operating the dimensioner apparatus in the 2-D mode is based on comparing the one or more dimensions of the hole region with one or more dimension thresholds.

In an example embodiment, the processor is further configured to cause the first image capturing device to capture a second structured light image of the field of view, wherein the processor is configured to generate a second 3D point cloud based on the second structured light image, wherein the second 3D point cloud is representative of the 2-D object placed on the structured light absorbing platform.

In an example embodiment, the processor is further configured to: identify one or more 3D points from the second 3-D point cloud of the at least one 2-D object, wherein the one or more 3D points define a periphery of the 2-D object; and determining, by the processor, the one or more dimensions of the 2-D object based at least in part on a count of the one or more 3D points.

Various embodiments illustrated herein disclose a method for measuring one or more dimensions of a two-dimensional (2-D) object. The method includes causing, by a processor, a projector to project structured light in a field of view of a dimensioner apparatus, wherein a structured light absorbing platform is in the field of view, and wherein a 2-D object is placed on the structured light absorbing platform. The method further includes causing, by the processor, a first image capturing device to capture a first structured light image of the field of view of the dimensioner apparatus. Additionally, the method includes analyzing, by the processor, the first image to identify a hole region in the first structured light image, wherein the hole region in the first structured light image indicates a presence of the structured light absorbing platform in the field of view of the dimensioner apparatus. The method further includes determining, by the processor, whether the one or more determined dimensions of the hole region satisfy at least one dimension threshold. In response to determining that the one or more determined dimensions of the hole region satisfy the at least one dimension threshold, operating, by the processor, the dimensioner apparatus in a 2-D mode. Operating the dimensioner apparatus in the 2D mode includes identifying, by the processor, one or more 3D points from a three-dimensional (3-D) point cloud of the first structured light image, wherein the one or more 3D points define a periphery of the 2-D object. Further, operating the dimensioner apparatus in the 2D mode includes determining, by the processor, one or more dimensions of the 2-D object based at least in part on a count of the one or more 3D points.

In an example embodiment, the method further comprises receiving, by the processor, an input defining a reference plane in the field of view of the dimensioner apparatus, wherein the processor is configured to determine one or more dimensioner parameters based on the defined reference plane.

In an example embodiment, the one or more dimensioner parameters comprise a height of the dimensioner apparatus from the reference plane and an angle of the dimensioner apparatus with respect to a stand on which the dimensioner apparatus is mounted.

In an example embodiment, the method further comprises detecting one or more edges of the 2D object, wherein the one or more edges define the periphery of the 2D object.

In an example embodiment, the method further comprises determining a shape of the 2D object, wherein the one or more dimensions of the 2D object is determined based on the shape of the 2D object.

In an example embodiment, the shape of the 2D object is one of a rectangle or an irregular shape, wherein when the shape of the 2D object corresponds to the irregular shape, the one or more dimensions of the 2D object correspond to one or more dimensions of a minimum bounding box encompassing the irregular shaped 2D object.

The above summary is provided merely for purposes of providing an overview of one or more exemplary embodiments described herein to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
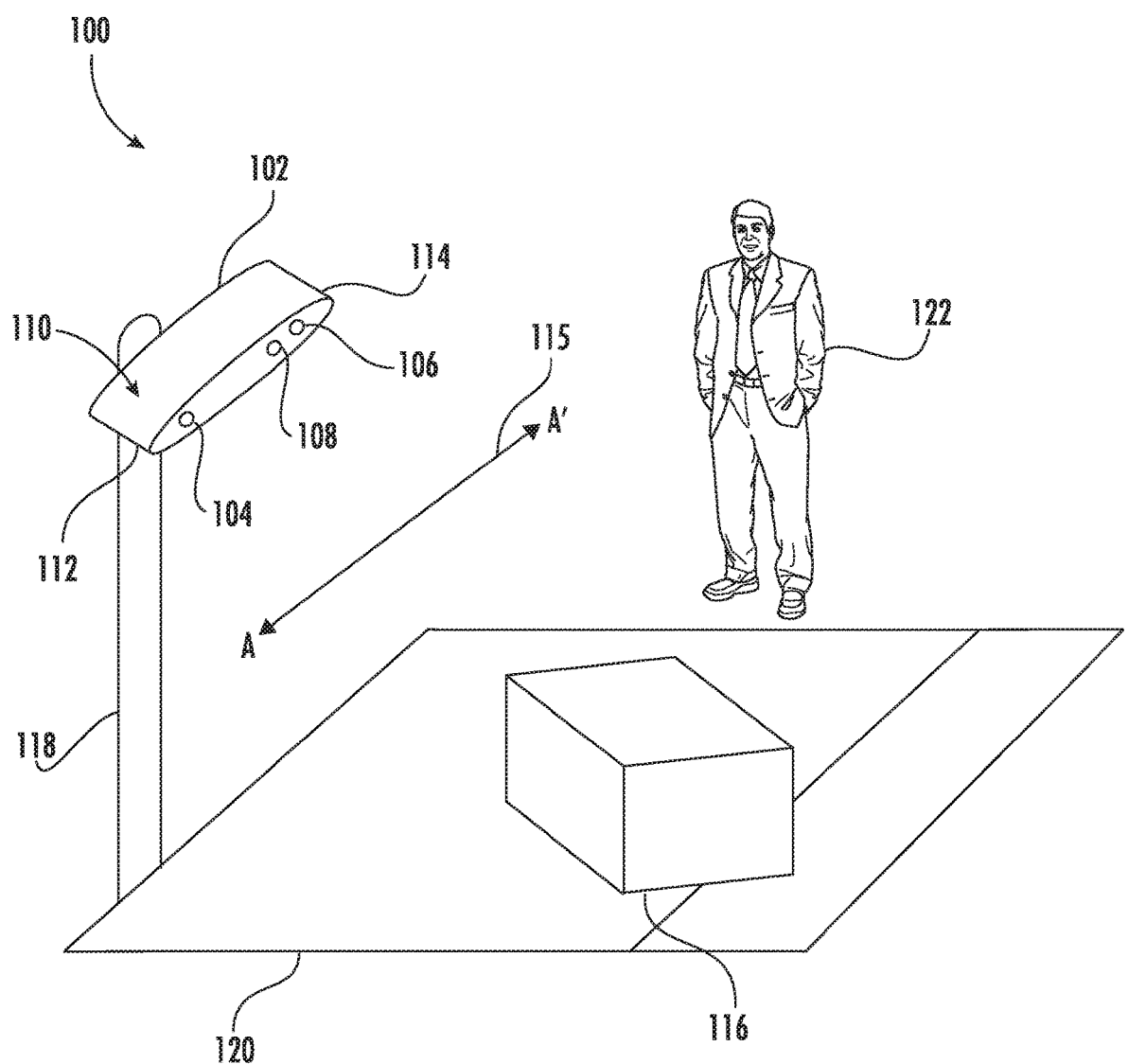
FIG. 1 illustrates an exemplary material handling environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this disclosure is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The term "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "image" as used herein may correspond to a representation of an information/data in the form of plurality of pixels in an image plane that may be either a 2-dimensional plane or a 3-dimensional plane. In some examples, the image may represent information/data of a scene where each pixel in the plurality of pixels may, for example, represent a point in the scene. Furthermore, each pixel in the plurality of pixels may include an associated color information and intensity information. Color information may be represented in form of one or more color schemes such as, but not limited to, RGB color scheme, CMYK color scheme, monochrome color scheme, grayscale color scheme, and/or the like. In some example embodiments, the intensity information may be representative of a brightness associated with each pixel. In some example embodiments, the pixel may further include depth information that may correspond to a distance of the point in the scene (represented by the pixel) from an image capturing device that captured the image. In an example embodiment, the image may be encoded and represented in one or more formats such as JPEG, Bitmap, PNG, RAW, and/or the like.

The term "object" as used herein may correspond to a physical item, element, device, or the like that is present in a scene that is captured by an image capturing device such as a camera. For example, a warehouse or a retail outlet (e.g., a scene) may include objects such as parcels, cartons, shipping containers, and/or the like. In some examples, the object may correspond to a two-dimensional (2D) object and/or a three-dimensional (3D) object. In an example embodiment, the 3D object may correspond to an object that has three dimensions (e.g., height, width, and length). In an example embodiment, the 2D object may correspond to a 3D object where one of the dimensions (e.g., height) is negligible. Some examples of the 2D object may include, but are not limited to, a piece of paper, an envelope, etc.

The terms "one or more dimensions" as used herein may correspond to any measurement indicative of a size of an object. For example, the one or more dimensions of a cuboidal parcel in a warehouse environment (e.g., scene) may include a measurement of a height of the parcel, a length of the parcel, and/or a width of the parcel. In some example embodiments, the one or more dimensions of an object having an irregular shape may be defined as a measurement of a size of a virtual cuboidal box that encompasses the irregular object (e.g., a length, width, and height of the virtual cuboid).

A dimensioner apparatus may include elements such as projectors and image capturing devices that operate in conjunction to determine one or more dimensions of an object. The projector may be configured to project structured light on the object. In some examples, the structured light may correspond to a light radiation in a predetermined light spectrum range. For example, the structured light may lie in the infrared light spectrum range. Further, the structured light may include one or more uniquely identifiable features such as barcode type stripes, a plurality of dots, and/or the like.

The image capturing devices, in the dimensioner apparatus, may be configured to capture images of the object (e.g., a visible light spectrum image, infra-red (IR) light spectrum image, or the like). For example, in an implementation in which the structured light corresponds to light radiation in the infrared spectrum range, the image capturing devices may be configured to capture the images of the reflected portions of the infrared light (referred to as IR spectrum image). Thereafter, a processor in the dimensioner apparatus may determine one or more dimensions of the object via a correlation between the projected structured light and captured images. For example, the processor may be configured to determine the one or more dimensions of the object based on the correlation between the structured light projected by the projector and the images of reflected portions of the structured light.

Technical challenges exist where the one or more dimensions of the 2-D object (such as an envelope, a piece of paper, etc.) are to be determined as one of the one or more dimensions of the 2D object is negligible. For example, when an envelope is placed on the floor, it creates no or negligible volume. Because the height of the 2D object is negligible, it is challenging to distinguish between the 2D object and the surface of the other objects (on which such 2D object may have been placed) from the captured images. For example, it may be difficult to distinguish between the 2D object and the platform on which the 2D object is placed for dimensioning purposes.

To enable the dimensioner apparatus to detect the 2D object, in some examples, the 2D object may be placed on a pylon tool. However, in such implementations, the one or more dimensions determined by the dimensioner apparatus may be inaccurate as the 2D object may bend around the pylon tool, causing the original contour of the 2D object to change. In another implementation, the dimensioner apparatus may utilize the color image (i.e., the visible light spectrum image) to detect the 2D object and accordingly, determine the one or more dimensions of the 2D object. However, the color of the object may, in some examples, be similar to the color of the background, and/or other objects in the field of view of the image capturing devices, which may lead to incorrect detection of the 2D object. This may further lead to inaccurate determination of the one or more dimensions of the 2D object.

In accordance with the embodiments illustrated herein, a dimensioner apparatus is disclosed. The dimensioner apparatus includes a projector, a first image capturing device, and a second image capturing device. The projector and the first image capturing device may operate in the same light spectrum range (e.g., the infra-red IR light spectrum range). The projector may be configured to project the structured light in a field of view of the dimensioner apparatus. The first image capturing device may be configured to capture the first structured light image of the field of view. Because the first image capturing device and the projector operate in the same light spectrum range, the first structured light image captured by the first image capturing device corresponds to an image of the reflected portion of the structured light projected by the projector.

Thereafter, in an example embodiment, a processor in the dimensioner apparatus may be configured to generate a 3D point cloud of the field of view of the dimensioner apparatus from the captured first structured light image. The 3D point cloud may correspond to an image where each pixel has an associated depth information. In an example embodiment, the depth information associated with a pixel in 3D point cloud may correspond to a distance of a point (represented by the pixel in the 3D point cloud) in the common field of view from the dimensioner apparatus. Hereinafter, the pixels having the associated depth information are referred to as 3D points.

By default, the dimensioner apparatus is configured to operate in a 3D mode in which the dimensioner apparatus is configured to determine the one or more dimensions of a 3D object (for example, parcels) placed within the field of the view of the dimensioner apparatus. To enable the dimensioner apparatus to determine the one or more dimensions of a 2D object placed within the field of the view of the dimensioner apparatus, a structured light absorbing platform is placed within the field of view of the dimensioner apparatus. In some examples, such platform may absorb a portion of the structured light that is projected on the platform. For example, the structured light absorbing platform may be configured to absorb the infrared light projected by the projector. Because the structured light absorbing platform absorbs the structured light, the 3D point cloud (i.e., generated from the captured first structured light image) includes pixels that do not have the associated depth information, and is therefore depicted as a void in 3D point cloud. Such void in the 3D point cloud is referred to as a hole region.

The processor in the dimensioner apparatus may be configured to detect such hole region in the captured image. For example, the processor may identify such hole region by identifying pixels in the 3D point cloud that do not have the associated depth information. Such pixels constitute the hole region. Thereafter, the processor is configured to determine measurements of one or more dimensions of the hole region in the 3D point cloud. For example, the processor may be configured to determine the measurements of the width and the length of the hole region. Thereafter, the processor may be configured to determine whether the measurements of the one or more dimensions of the hole region satisfy one or more dimension thresholds. In some examples, the one or more dimension thresholds may correspond to the actual dimensions of the structured light absorbing platform.

In an instance in which the measurements of the one or more dimensions of the hole region satisfy the one or more dimension thresholds, the processor may determine that the structured light absorbing platform is present in the field of the view of the dimensioner apparatus. Accordingly, the processor may configure the dimensioner apparatus to operate in a 2D mode. In the 2D mode, the dimensioner may be configured to detect the 2D object (for which the measurements of the one or more dimensions are to be determined) placed on the structured light absorbing platform. For example, the processor may cause the first image capturing device to capture a second structured light image of the field of view. The 2D object is placed on the IR absorbing platform, and the 2D object reflects the structured light projected by the projector (i.e., the 2D object is not IR absorbing). The 3D point cloud generated from the second structured light image may depict a set of 3D points surrounded by the hole region. In some examples, the set of 3D points correspond to the 2D object. Accordingly, the dimensioner apparatus is able to detect the periphery of the 2D object.

Thereafter, the processor may be configured to identify one or more 3D points from the set of 3D points that may define the periphery of the 2D object. Further, based on the one or more identified 3D points, the processor may be configured to determine the one or more dimensions of the 2D object. For example, based on the count of the one or more identified 3D points, the processor may be configured to determine the one or more dimensions of the 2D object.

FIG. 1 illustrates an exemplary material handling environment 100, according to one or more embodiments described herein. The material handling environment 100 may refer to environments related to, but not limited to, manufacturing of the items, inventory storage of the items, packing and unpacking of the items, preparing customer orders, recording items related information based on scanning and identification of the items, and shipment processing (including shipping and logistics distribution of the items). In such environments, many workers perform different operations that may involve handling of items during various phases (including, but not limited to, accumulation, sortation, scanning and identification, packing, and shipment preparation etc.) of an overall operation cycle of the material handling environment 100. For example, the workers may be involved in manual packing and unpacking of the items while preparing customer orders for shipping. In another example, the workers may handle placing of the items in an accumulation zone of a conveyor system for automated packing of the items. In some environments, workers may use electronic devices like personal digital assistants (PDAs) or mobile devices connected to a headset and a server to receive automated or voice directed instructions for performing various operations including scanning and identification of labels (e.g., barcodes, RFID tags, etc.) affixed on the items for shipment preparation. As illustrated in FIG. 1, the material handling environment 100 includes a dimensioner apparatus 102 that is configured to determine one or more dimensions of an object 116 and/or a 2-D object placed on the object 116.

Figure 3:
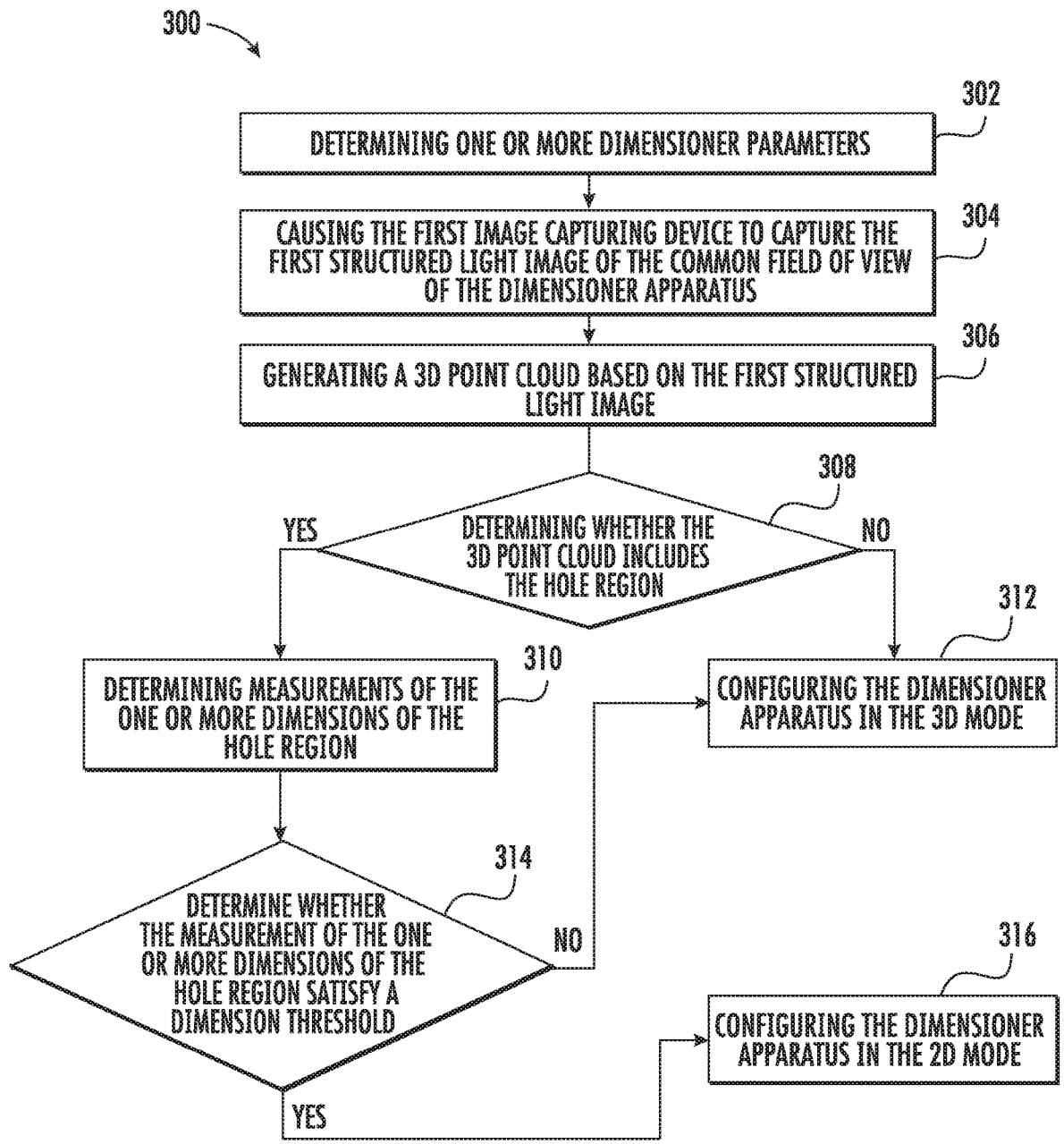
FIG. 3 illustrates a flowchart of a method for operating the dimensioner apparatus, according to one or more embodiments described herein.
Figure 6:
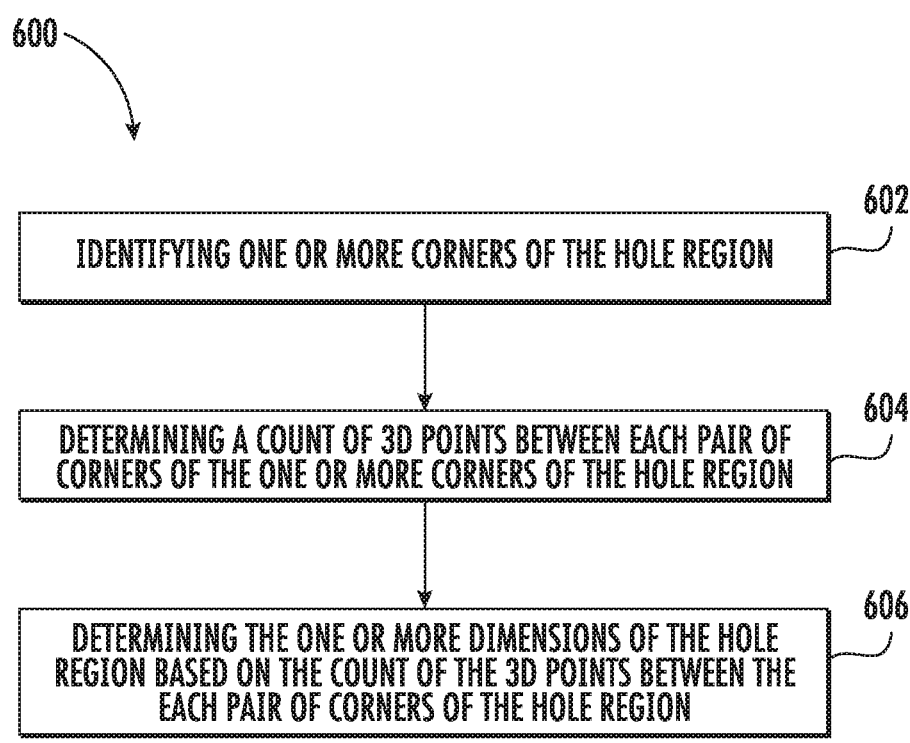
FIG. 6 illustrates a flowchart of a method for determining one or more dimensions of hole regions, according to one or more embodiments described herein.
Figure 7:
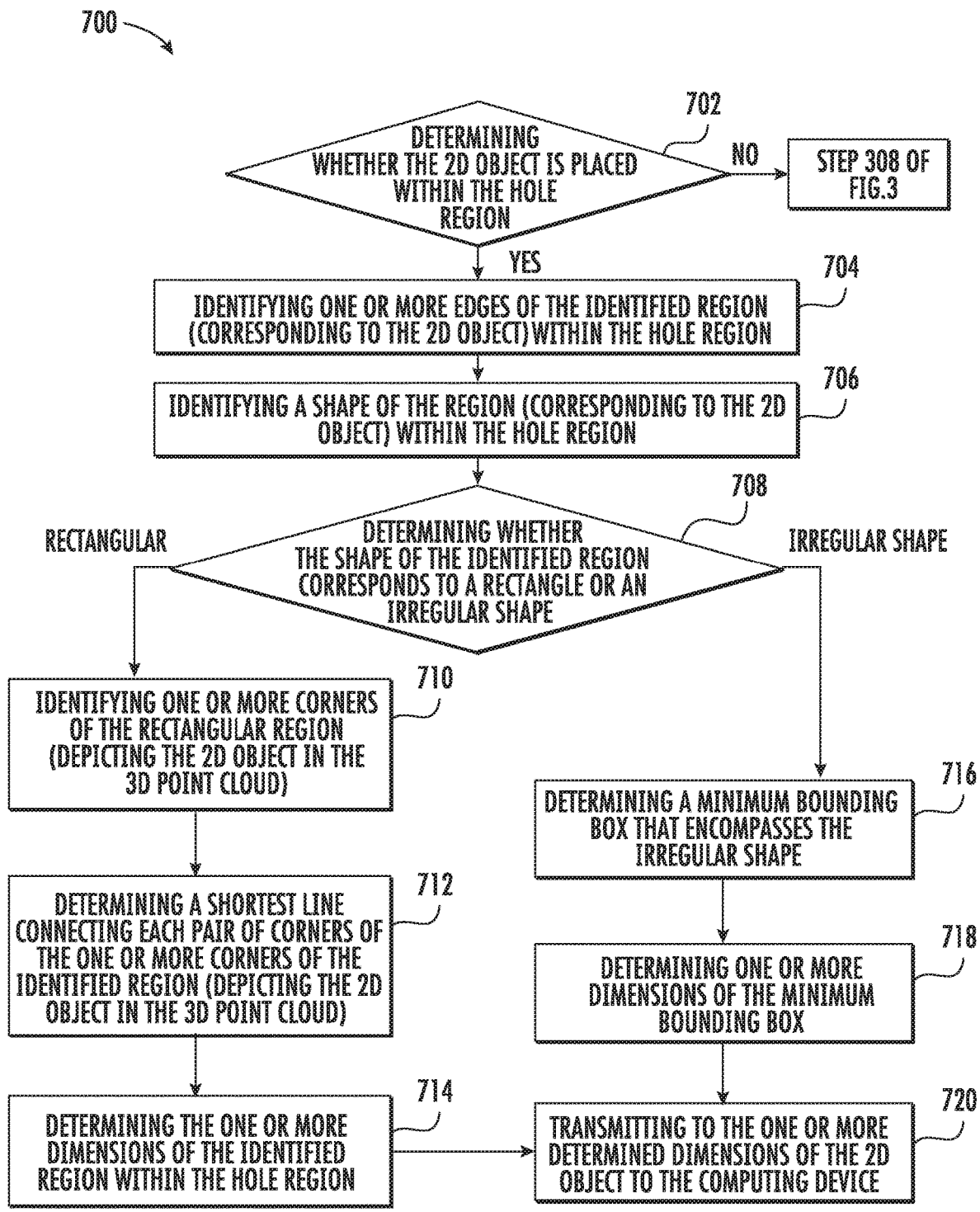
FIG. 7 illustrates a flowchart of a method for operating the dimensioner apparatus in the 2D mode, according to one or more embodiments described herein.

The dimensioner apparatus 102 may correspond to an electronic device that may be configured to determine one or more dimensions of one or more objects (e.g., the object 116, a 2-D object placed on the object 116), as is further described in conjunction with FIGS. 3, 6 and 7. In an example embodiment, the dimensioner apparatus 102 may include a projector 104. Further, the dimensioner apparatus 102 may include one or more image capturing devices such as a first image capturing device 106 and a second image capturing device 108. In an example embodiment, the projector 104, the first image capturing device 106, and the second image capturing device 108 may be positioned in a rig-type housing 110. In an example embodiment, the rig-type housing 110 may have a first end portion 112 and a second end portion 114. The first end portion 112 and the second end portion 114 may be spaced apart from each other along a longitudinal axis A-A' 115. In some examples, the first image capturing device 106, and the second image capturing device 108 are positioned proximate the second end portion 114, while the projector 104 is positioned proximate the first end portion 112. Further, the first image capturing device 106 may be positioned between the second image capturing device 108 and the projector 104. In some embodiments, a distance between the first image capturing device 106 and the projector 104 may be greater than a distance between the second image capturing device 108 and the projector 104.

In some examples, the dimensioner apparatus 102 may utilize one or more of the projector 104, the first image capturing device 106, and the second image capturing device 108, to determine the one or more dimensions of an object 116 and/or a 2-D object placed on the object 116, as is further described in conjunction with FIGS. 3, 6 and 7. In some examples, to enable the dimensioner apparatus 102 to determine the one or more dimensions of the object 116, the dimensioner apparatus 102 may be mounted on a stand 118 such that a platform 120 is within a field of view of the dimensioner apparatus 102. In an example embodiment, the field of view of the dimensioner apparatus 102 may correspond to a common field of view of one or more of the projector 104, the first image capturing device 106, and the second image capturing device 108. In some examples, for the dimensioner apparatus 102 to determine the one or more dimensions of the object 116, a human operator (e.g., the operator 122) may place an object 116 on the platform 120. Thereafter, the dimensioner apparatus 102 may determine the one or more dimensions of the object 116.

In some embodiments, the object 116 may correspond to a 2D object such as, but not limited to, an envelope, a piece of paper. In some embodiments, the object 116 may correspond to a 3D object such as, but not limited to, a parcel, a package, and a carton. In some embodiments, the object 116 may correspond to a structured light absorbing platform, as described in details hereinafter.

The projector 104 may correspond to an illumination source that may be configured to illuminate the one or more objects in the common field of view. As discussed above, the common field of view of the projector 104 may correspond to the field of view for both the second image capturing device 108 and the first image capturing device 106 such that the projector 104 is configured to illuminate the one or more objects within the field of view for both the second image capturing device 108 and the first image capturing device 106. To illuminate the one or more objects, the projector 104 may be configured to project light within the common field of view of the projector 104, the second image capturing device 108, and the first image capturing device 106. For example, if the common field of view includes the object 116, the projector 104 may project the light on the object 116 to illuminate the object 116 (and any object placed on the object 116). In some examples, the projector 104 may include a lens assembly that may facilitate the projection of the light on the one or more objects within the common field of view. The lens assembly may include one or more optical components such as one or more lenses, diffusers, wedges, reflectors, or any combination thereof that may facilitate the projection of the light. In some examples, the projector 104 may be configured to project a structured light (e.g., structured light pattern) on the one or more objects within the common field of view. In an example embodiment, the structured light may correspond to a predetermined light pattern that may be projected on the one or more objects within the common field of view. In some examples, the projected structured light may correspond to a light signal that is outside the visible light spectrum. For example, the projected structured light may be an infra-red (IR) light. Hereinafter, the light projected by the projector 104 may interchangeably referred to as the structured light, structure light pattern, or the like.

In some example embodiments, the first image capturing device 106 may include a lens assembly (not shown) and a sensor assembly (not shown). In an example embodiment, the sensor assembly in the first image capturing device 106 may be configured to detect the structured light projected by the projector 104. In some embodiments, the first image capturing device 106 may be configured to detect a reflected portion of the structured light. The reflected portion of the structured light may correspond to a portion of the structured light reflected from the one or more objects within the common field of view (for example the object 116). Further, the sensor assembly in the first image capturing device 106 may be configured to detect the lights signals outside the visible light spectrum. For example, the sensor assembly and the projector may be configured to operate in the same light spectrum range. For example, the sensor assembly in the first image capturing device 106 may be configured to detect the Infra-Red (IR) structured light projected by the projector 104. In an example embodiment, the first image capturing device 106 may be configured to generate a structured light image, as is further described in conjunction with FIG. 3.

The second image capturing device 108 in the dimensioner apparatus 102 may correspond to a camera device that is capable of generating a color image based on light signals received from the common field of view of the dimensioner apparatus 102. In some examples, the second image capturing device 108 may be configured to generate the image based on reception of light signals in the visible light spectrum. In an example embodiment, the light signal received by the second image capturing device 108 may correspond to a light generated by an illumination source on the dimensioner apparatus 102. In alternative embodiment, the illumination source may be external to the dimensioner apparatus 102. In yet another alternative embodiment, the illumination source may be the ambient light around the dimensioner apparatus 102.

In an example embodiment, the second image capturing device 108, the first image capturing device 106, and the projector 104 may have a fixed focal length. Further, the focal length of each of the second image capturing device 108, the first image capturing device 106, and the projector 104 may be the same. In other embodiments, one or more of the second image capturing device 108, the first image capturing device 106, and the projector 104 may have a variable focal length that may be modified manually or automatically.

In an example embodiment, the dimensioner apparatus 102 may determine the one or more dimensions of the object 116 and/or a 2-D object placed on the object 116 based on the structured light image (captured by the first image capturing device 106) and/or the color image (captured by the second image capturing device 108), as is further described in conjunction with FIGS. 3, 6 and 7.

In an example embodiment, the dimensioner apparatus 102 may be configured to operate in one or more modes. In some examples, the one or more modes of the dimensioner apparatus 102 include, but are not limited to, a 3D mode and a 2D mode. The operation of the dimensioner apparatus 102 in the 3D mode and in the 2D mode is described in conjunction with FIG. 3 and FIGS. 6 and 7, respectively. The operation and the structure of the dimensioner apparatus 102 is described in conjunction with FIG. 2.

Figure 2:
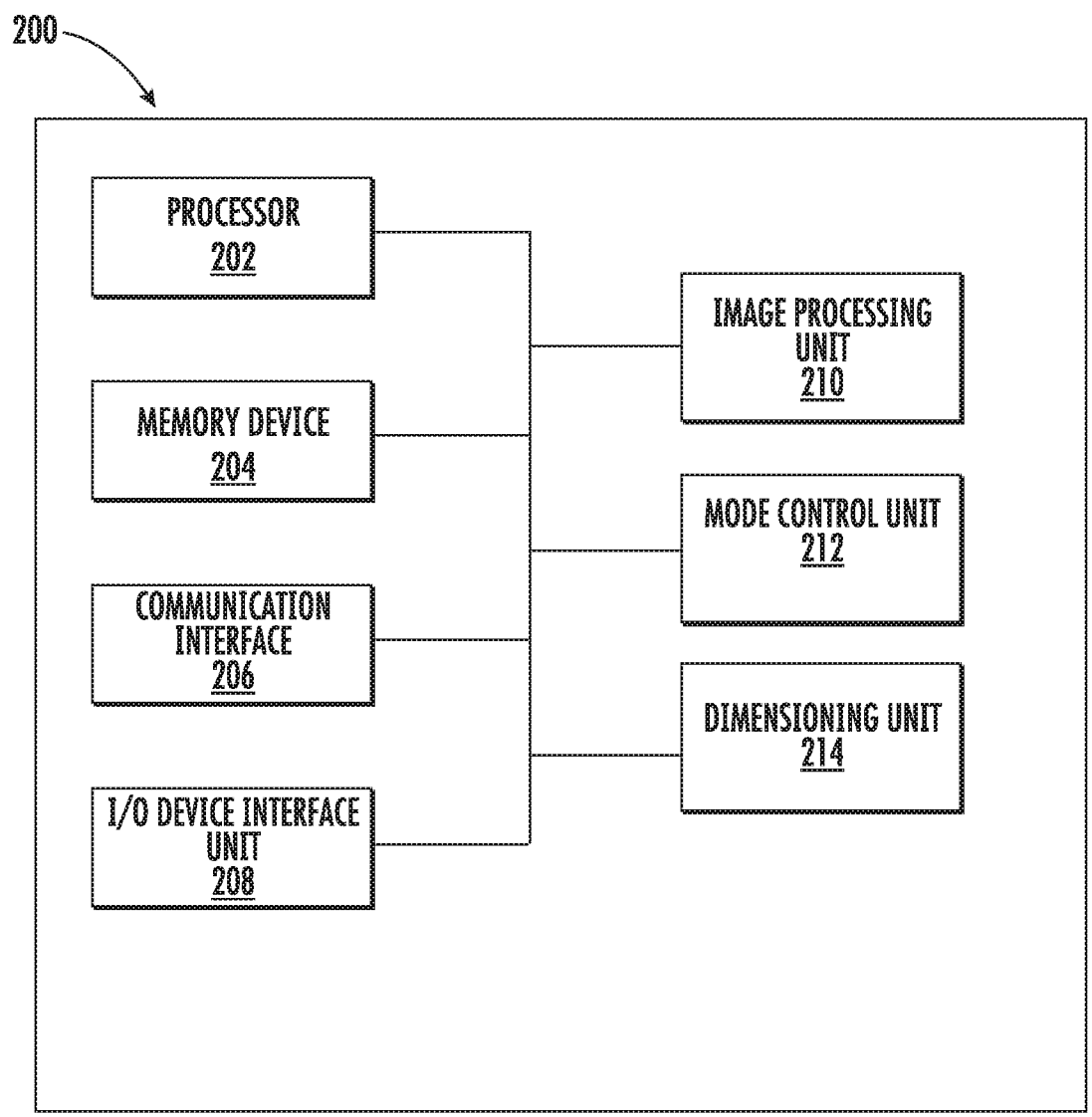
FIG. 2 illustrates a block diagram of a dimensioner apparatus, according to one or more embodiments described herein.

FIG. 2 illustrates a block diagram 200 of the dimensioner apparatus 102, according to the one or more embodiments described herein. In an example embodiment, the dimensioner apparatus 102 includes a processor 202, a memory device 204, a communication interface 206, an input/output device interface unit 208, an image processing unit 210, a mode control unit 212, and a dimensioning unit 214.

The processor 202 may be embodied as one or more microprocessors with accompanying digital signal processor (s), one or more processor(s) without an accompanying digital signal processor, one or more coprocessors, one or more multi-core processors, one or more controllers, processing circuitry, one or more computers, or various other processing elements including integrated circuits such as an application specific integrated circuit (ASIC), field programmable gate array (FPGA), or any combination thereof. Accordingly, although illustrated in FIG. 2 as a single processor, the processor 202 may include a plurality of processors and/or signal processing modules. The plurality of processors may be embodied on a single electronic device or may be distributed across a plurality of electronic devices collectively configured to function as the circuitry of the dimensioner apparatus 102. The plurality of processors may be in operative communication with each other and may be collectively configured to perform one or more functionalities of the circuitry of the dimensioner apparatus 102, as described herein. In an example embodiment, the processor 202 may be configured to execute instructions stored in a memory device 204 or otherwise accessible to the processor 202. These instructions, when executed by the processor 202, may cause the circuitry of the dimensioner apparatus 102 to perform one or more of the functionalities as described herein.

Whether configured by hardware, firmware/software methods, or by a combination thereof, the processor 202 may include an entity capable of performing operations according to embodiments of the present disclosure while configured accordingly. Thus, for example, when the processor 202 is embodied as an ASIC, FPGA, or the like, the processor 202 may include specifically configured hardware for conducting one or more operations described herein. Alternatively, as another example, when the processor 202 is embodied as an executor of instructions, such as may be stored in the memory device 204, the instructions may specifically configure the processor 202 to perform one or more algorithms and operations described herein.

Thus, the processor 202 used herein may refer to a programmable microprocessor, microcomputer, or multiple processor chip(s) that may be configured by software instructions (e.g., applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 204 may include suitable logic, circuitry, and/or interfaces that are adapted to store a set of instructions that is executable by the processor 202 to perform predetermined operations. Some of the commonly known memory implementations include, but are not limited to, a hard disk, random access memory, cache memory, read only memory (ROM), erasable programmable read-only memory (EPROM) electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 204 may be integrated with the processor 202 on a single chip, without departing from the scope of the disclosure.

The communication interface 206 may correspond to a communication interface that may facilitate transmission and reception of messages and data to and from the dimensioner apparatus 102. For example, the communication interface 206 may be communicatively coupled with other components of the dimensioner apparatus 102 to transmit/receive data to/from a computing device (not shown). Examples of the communication interface 206 may include, but are not limited to, an antenna, an Ethernet port, a USB port, a serial port, or any other port that can be adapted to receive and transmit data. The communication interface 206 transmits and receives data and/or messages in accordance with the various communication protocols, such as, I2C, TCP/IP, UDP, and 2G, 3G, 4G, or 5G communication protocols.

The input/output device interface unit 208 may include suitable logic and/or circuitry that may be configured to communicate with the one or more components of the dimensioner apparatus 102, in accordance with one or more device communication protocols such as, but not limited to, I2C communication protocol, Serial Peripheral Interface (SPI) communication protocol, serial communication protocol, Control Area Network (CAN) communication protocol, and 1-Wire® communication protocol. In an example embodiment, the input/output device interface unit 208 may communicate with the projector 104, the first image capturing device 106, and the second image capturing device 108. Some examples of the input/output device interface unit 208 may include, but not limited to, a Data Acquisition (DAQ) card, an electrical drives driver circuit, and/or the like.

The image processing unit 210 may include suitable logic and/or circuitry that may enable the image processing unit 210 to process one or more images captured by the first image capturing device 106 and the second image capturing device 108. For example, the image processing unit 210 may be configured to generate a 3D point cloud based on the structured light image, as is further described in FIG. 3. Further, image processing unit 210 may be configured to identify a hole region in the 3D point cloud, as is further described in FIG. 3. The image processing unit 210 may utilize processing circuitry, such as the processor 202, to perform these actions. In some embodiments, the image processing unit 210 may include a separate processor, specially configured Field Programmable Gate Array (FPGA), or Application Specific Integrated Circuit (ASIC).

The mode control unit 212 may include suitable logic and/or circuitry that may enable the mode control unit 212 to configure to the dimensioner apparatus 102 in the one or more modes. For example, the mode control unit 212 may configure the dimensioner apparatus 102 in a 2D mode or a 3D mode, as is further described in FIG. 3. The mode control unit 212 may utilize processing circuitry, such as the processor 202, to perform these actions. In some embodiments, the mode control unit 212 may include a separate processor, specially configured Field Programmable Gate Array (FPGA), or Application Specific Integrated Circuit (ASIC).

In an example embodiment, the dimensioning unit 214 may include suitable logic and/or circuitry that may enable the dimensioning unit 214 to determine one or more dimensions of one or more objects (e.g., the object 116) within the common field of the view of the dimensioner apparatus 102. For example, the dimensioning unit 214 may be configured to determine the one or more dimensions of the hole region in the 3D point cloud, as is further described in conjunction with FIG. 3. In an example embodiment, when the dimensioner apparatus 102 is in the 3D mode, the dimensioning unit 214 may be configured to determine the one or more dimensions of the 3D object (e.g., the object 116), as is further described in conjunction with FIG. 3. Further, in an example embodiment, when the dimensioner apparatus 102 is configured to operate in the 2D mode, the dimensioning unit 214 may be configured to determine the one or more dimensions of the 2D object, as is further described in conjunction with FIGS. 6 and 7. The dimensioning unit 214 may utilize processing circuitry, such as the processor 202, to perform these actions. In some embodiments, the dimensioning unit 214 may include a separate processor, specially configured Field Programmable Gate Array (FPGA), or Application Specific Integrated Circuit (ASIC).

In an example embodiment, the functionalities of various units in the dimensioner apparatus 102 may be integrated as a single unit. For example, all the functionalities of the input/output device interface unit 208, the mode control unit 212, the image processing unit 210, and the dimensioning unit 214 may be integrated in the processor 202, without departing from the scope of the disclosure.

FIGS. 3, 6 and 7 illustrate example flowcharts of the operations performed by an apparatus, such as the dimensioner apparatus 102 of FIG. 1 and FIG. 2 in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 6, and 7, when executed, convert a computer or processing circuitry into a particular machine configured to perform an example embodiment of the present invention. Accordingly, the operations of FIGS. 3, 6, and 7 define one or more algorithms for configuring a computer or processor to perform one or more example embodiments. In some cases, a general purpose computer may be provided with an instance of the processor which performs the algorithm of FIGS. 3, 6, and 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 3 illustrates a flowchart 300 of a method for operating the dimensioner apparatus 102 according to one or more embodiments described herein.

At step 302, the dimensioner apparatus 102 may include means, such as the processor 202, the communication interface 206, the image processing unit 210, and/or the like, for determining one or more dimensioner parameters. In some examples, the one or more dimensioner parameters may include, but are not limited to, a height of the dimensioner apparatus 102 from the platform 120, and/or an angle between the dimensioner apparatus 102 and the stand 118. In some examples, to determine the one or more dimensioner parameters, the worker may provide the input on the computing device (communicatively coupled to the dimensioner apparatus 102) to cause the dimensioner apparatus 102 to capture an image. For example, on receiving the input from the worker, the computing device may be configured to transmit an instruction to the dimensioner apparatus 102. On receiving the instruction, the input/output device interface unit 208 of the dimensioner apparatus 102 may be configured to cause the second image capturing device 108 to capture the image. As discussed, the second image capturing device 108 operates in the visible spectrum range. Accordingly, the image (captured by the second image capturing device 108) corresponds to a color image.

In some examples, the communication interface 206 may be configured to transmit the color image to a computing device (not shown). In some examples, the computing device may display the color image to the worker on a display screen. Thereafter, the worker may provide the input on the computing device to define a reference plane. The reference plane may correspond to a plane in the common field of view that corresponds to a surface on which the object 116 is kept for purpose of determining the one or more dimensions of the object 116. In an example embodiment, the input may correspond to defining a periphery of the reference plane. For example, the worker may provide the input to draw a virtual rectangle or a circle on the image. The periphery of the virtual rectangle or the circle may correspond to the periphery of the reference plane. In some examples, the periphery of the reference plane (i.e., the periphery of the virtual rectangle or the circle) and the area encompassed by the virtual rectangle or the circle correspond to the information pertaining to the reference plane. More particularly, the coordinates of a first set of pixels in the color image located on the periphery of the reference plane and the coordinates of a second set of pixels encompassed within the periphery of the reference plane constitute the information pertaining to the reference plane. In an example embodiment, the computing device may be configured to transmit the information pertaining to the reference plane to the dimensioner apparatus 102.

In some examples, on receiving the information pertaining to the reference plane, the communication interface 206 may be configured to store the information pertaining to the reference plane in the memory device 204. In an example embodiment, the dimensioner apparatus 102 may utilize the information pertaining to the reference plane to determine the one or more dimensioner parameters. For example, to determine the one or more dimensioner parameters, the input/output device interface unit 208 may cause the projector 104 to project the structured light in the common field of view of the dimensioner apparatus 102. In an example embodiment, as discussed, the structured light may correspond to the predetermined light pattern that is comprises one or more features such as, but not limited to, a plurality of barcode type stripes, a checkered board pattern, a plurality of dots, and/or the like. In some examples, each of the one or more features is uniquely identifiable by the image processing unit 210. For example, each dot in the plurality of dots has an associated unique code based on which the image processing unit 210 uniquely identifies each dot in the plurality of dots.

Further, the input/output device interface unit 208 may cause the first image capturing device 106 to capture an original structured light image of the reference plane. As discussed, the first image capturing device 106 and the projector 104 operate within the same light spectrum range (i.e., the infrared spectrum). Therefore, the original structured light image (corresponding to the image captured by the first image capturing device 106) includes the image of reflected structured light (i.e., the structured light reflected from the various objects within the common field of view of the dimensioner apparatus 102). For instance, if the structured light corresponds to the plurality of dots, the original structured light image includes the image of the plurality of dots.

As discussed, the first image capturing device 106 and the projector 104 operate within the same light spectrum range (i.e., the infrared spectrum). Therefore, the original structured light image (corresponding to the image captured by the first image capturing device 106) includes the image of reflected structured light (i.e., the structured light reflected from the various objects within the common field of view of the dimensioner apparatus 102). For instance, if the structured light corresponds to the plurality of dots, the original structured light image includes the image of the plurality of dots.

From the original structured light image, the image processing unit 210 may be configured to identify each of the plurality of dots (for example based on the associated unique codes) and their corresponding position in the original structured light image. More particularly, the image processing unit 210 may be configured to determine the position of one or more dots within the reference plane in the original structured light image. For example, the image processing unit 210 may determine the coordinates of a third set of pixels in the original structured light image that corresponds to the reference plane (e.g., the platform 120) based on the information pertaining to the reference plane stored in the memory device 204.

As discussed, the information pertaining to the reference plane may include the coordinates of the first set of pixels and the second set of pixels in the color image. In some examples, the image processing unit 210 may be configured to determine the coordinates of a third set of pixels in the structured light image based on the coordinates of the first set of pixels and the coordinates of the second set of pixels in the color image. In an example implementation, the image processing unit 210 may utilize one or more predetermined parameters, such as a fundamental matrix, to determine the coordinates of the third set of pixels (representing the reference plane) in the structured light image. In an example embodiment, the fundamental matrix may correspond to a mathematical relation between coordinates of the pixels of the structured light image and coordinates of the pixels of the color image. Once the coordinates of the third set of pixels in the structured light image are determined, the image processing unit 210 may be configured to determine the position of the one or more dots of the plurality of dots within the reference plane (e.g., the one or more dots reflected from the platform 120). For example, the image processing unit 210 determines that the position of the first dot of the one or more dots in the structured light image as $(x_1, y_1)$. Thereafter, the image processing unit 210 may be configured to compare the position of each of the one or more dots within the reference plane in the structured light image with the position of the one or more dots as projected by the projector 104. In some examples, the position of the one or more dots as projected by the projector 104 may be defined as the position of the one or more dots in a projection plane. In an example embodiment, the projection plane is a virtual image plane that defines positions of the content projected by the projector 104. For example, the projector plane may be utilized to define the coordinates of the features (e.g., the plurality of dots) of the structured light projected by the projector 104.

Based on the comparison of the position of the one or more dots (within the reference plane) in the structured light image and the position of the one or more dots in the projection plane, the image processing unit 210 may be configured to determine the one or more dimensioner parameters (i.e., the angle between the dimensioner apparatus 102 and the stand 118, and the height of the dimensioner apparatus 102 from the reference plane). For example, based on the comparison, the image processing unit 210 may determine a displacement between the positions of the one or more dots in structured light image and the position of the one or more dots in the projection plane. In some examples, the displacement between a position of a dot in the image and the position of the dot in the projection plane may be due to physical distance between the first image capturing device 106 and the projector 104 (i.e., the length of the rig-type housing 110), the height of the dimensioner apparatus 102 from the platform 120, and an angle between the stand 118 and the dimensioner apparatus 102. Therefore, based on the displacement between the position of the one or more dots in the structured light image and the position of the one or more dots in the projection plane, the processor 202 may be configured to determine the height of the dimensioner apparatus 102 from the reference plane (i.e., the platform 120). Further, based on the displacement between the position of the one or more dots in the structured light image and the position of the one or more dots in the projection plane, the processor 202 may determine the angle between the dimensioner apparatus 102 and the stand 118. In an example embodiment, the processor 202 may be configured to store the one or more dimensioner parameters in the memory device 204. Additionally, the image processing unit 210 may be configured to store the structured light image and the information pertaining to the position of each dot in the plurality of dots in the memory device 204.

After the one or more dimensioner parameters of the dimensioner apparatus 102 are defined, the operator 122 of the dimensioner apparatus 102 may keep the object 116 on the platform 120 for dimensioning purposes.

At step 304, the dimensioner apparatus 102 may include means such as, the processor 202, the input/output device interface unit 208, and/or the like, for causing the first image capturing device 106 to capture the first structured light image of the common field of view of the dimensioner apparatus 102. To capture to the first structured light image, the input/output device interface unit 208 may be configured to cause the projector 104 to project the structured light within the common field of view of the dimensioner apparatus 102. Thereafter, the input/output device interface unit 208 may be configured to cause the first image capturing device 106 to capture the first structured light image of the common field of view. For instance, if the structured light corresponds to the plurality of dots, the first structured light image (captured by the first image capturing device 106) may correspond to the image of the plurality of dots.

At step 306 the dimensioner apparatus 102 may include means, such as the processor 202, the image processing unit 210, and/or the like, for generating a 3D point cloud based on the first structured light image. In some examples, the 3D point cloud may correspond to an image in which each pixel has an associated depth information. In some examples, the depth information associated with a pixel may be representative a distance of a point (represented by the pixel in the first structured light image) from the dimensioner apparatus 102.

For generating the 3D point cloud, the image processing unit 210 may be configured to determine the depth information (hereinafter interchangeably referred to as depth) for each of the plurality of dots (i.e., the structured light) in the first structured light image. To determine the depth of the plurality of the dots, the image processing unit 210 may be configured to identify each dot in the plurality of dots (based on the unique code associated with each of the plurality of dots). Further, the image processing unit 210 may be configured to determine the position of the plurality of dots in the first structured light image.

Thereafter, the image processing unit 210 may be configured to determine a disparity between the coordinates of the plurality of dots in the first structured light image captured in step 304 and the coordinates of the plurality of dots in the original structured light image captured in the step 302. In an example embodiment, the disparity in the coordinates of a dot corresponds to a measure of a change in the position of the dot in the first structured light image from the position of the dot in the structured light image (captured in the step 302). In some examples, when the object 116 is placed on the platform 120, the one or more dots (originally projected on the platform 120) are projected on the object 116 instead of the platform 120. Therefore, the position of the one or more dots in the first structured light image will change from the position of the one or more dots in the structured light image (captured in the step 302). Based on the measure of the disparity, the image processing unit 210 may determine the depth of the dot from the dimensioner apparatus 102 based on the one or more dimensioner parameters. In some examples, the image processing unit 210 may utilize the following equation to determine the depth of the dot:

$$Z_i = \frac{fw}{\frac{fw}{z_0}} + d_i \quad (1)$$

Where:
$Z_i$: depth of the dot I;
f: focal length of the first image capturing device 106;
w: physical distance between the projector 104 and the first image capturing device 106;
$Z_0$: distance of the platform 120 from the dimensioner apparatus 102 (i.e., the height of the dimensioner apparatus 102 on the stand 118); and
$d_i$: disparity measure of the dot i.

Therefore, the image processing unit 210 may determine the depth of the dot based on at least the height of the dimensioner apparatus 102 on the stand 118 and the disparity associated with the dot.

Figure 4:
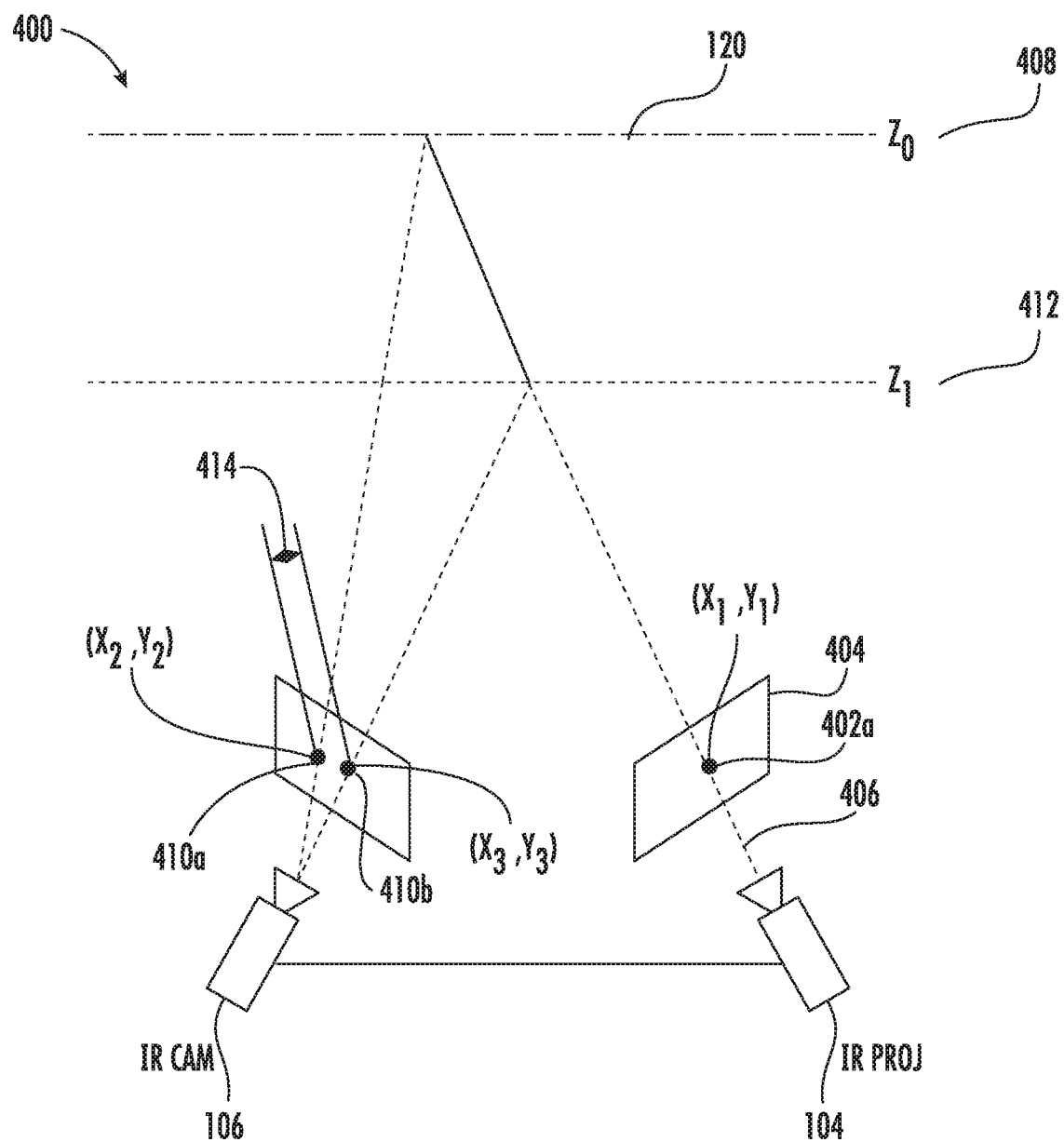
FIG. 4 illustrates a ray diagram depicting the determination of the depth of a dot, according to one or more embodiments described herein.

An example method of the determination of the depth of the dot of the one or more dots is further illustrated in FIG. 4. FIG. 4 illustrates a ray diagram 400 depicting the determination of the depth of the dot, according to one or more embodiments described herein. The ray diagram 400 illustrates the projection of the dot (e.g., 402a) on the projection plane 404 by a light ray 406 projected by the projector 104. The image processing unit 210 may determine the position of the dot 402a as $(x_1, y_1)$.

During the defining of the reference plane, the light ray 406 reflects from the platform 120 (i.e., the reference plane), which is at a distance $Z_0$ (e.g., 408). In some examples, the distance $Z_0$ (e.g., 408) may correspond to the height of the dimensioner apparatus 102 from the platform 120. The first image capturing device 106 receives the reflected light ray 406 and generates the structured light image in which the reflected light ray may be depicted by the dot 410a. Further, the image processing unit 210 may determine the position of the dot 410a as (x2, y2).

When the object 116 is placed on the platform 120 (i.e., the reference plane), the distance of the object 116 from the dimensioner apparatus 102 is less than the distance $Z_0$ (e.g., 408). Therefore, the light ray 406 corresponding to the dot 402a (in the projection plane) is reflected from the surface of the object 116, which is at a distance $Z_1$ (e.g., 412) from the dimensioner apparatus 102. Due to the change in the position of the reflection point of the light ray 406, the coordinates of the dot in the first structured light image corresponding to the dot 402a changes from $(x_2, y_2)$ to dot 410b $(x_3, y_3)$. The distance between the coordinates $(x_3, y_3)$ in the first structured light image and the coordinates $(x_2, y_2)$ in the structured light image corresponds to the disparity measure (e.g., 414). Thereafter, the image processing unit 210 determines the distance $Z_1$ (e.g., 412) based on the disparity measure using the equation (1).

Similarly, the image processing unit 210 determines the depth information of other dots of the plurality of dots projected by the projector 104. Thereafter, the image processing unit 210 may be configured to associate the determined depth information with the plurality of pixels (in the first structured light image) representing the plurality of dots to generate the 3D point cloud. In the 3D point cloud, the plurality of pixels that has the associated depth information are represented as a plurality of 3D points in the image. In an example embodiment, a 3D point is positioned in the 3D point cloud based on the depth information associated with the respective pixel, such that the plurality of 3D points, when viewed together, provide a virtual 3D view of the field of the view of the dimensioner apparatus 102. In some examples, the pixels that do not have the associated depth information are not illustrated in the 3D point cloud. For example, the pixels that do not have the associated depth information are blackened in the 3D point cloud and are classified as hole pixels, as described further below.

In other words, because the object 116 is placed within the field of view of the dimensioner apparatus 102, the one or more dots of the plurality of dots may be reflected from the surface of the object 116. Thus, in the first structured light image (captured by the first image capturing device 106), the one or more dots may represent the object 116. Further, in the 3D point cloud (generated from the first structured light image), one or more 3D points may be positioned in the 3D point cloud to represent a 3D shape of the object 116, based on the depth information associated with the respective pixels.

In some examples, where the object 116 corresponds to a structured light absorbing platform, the one or more dots projected to the object 116 may get absorbed by the surface of the object 116. For example, the object 116 may have IR radiation absorbing capabilities that may absorb the IR light projected by the projector 104. Therefore, the first image capturing device 106 may not receive the one or more dots (projected on the object 116). Accordingly, the first image capturing device 106 captures the first structured light image that may not include the one or more dots. Accordingly, the 3D point cloud, generated from the first structured light image, may include one or more pixels that may not have the associated depth information and thus are blackened in the 3D point cloud. Such regions in the 3D point cloud correspond to a hole region.

In some examples, the scope of the disclosure is not limited to determining the depth of the plurality of dots based on the methodology described above. In alternative embodiment, the image processing unit 210 may be configured to determine the depth of each of the plurality of dots using other methodologies such as, but not limited to, triangulation method, time of flight method, and/or the like. For example, the image processing unit 210 may determine the depth of the dot based on both the height of the dimensioner apparatus 102 from the platform 120 and the angle between the dimensioner apparatus 102 and the stand 118.

Referring back to FIG. 3, at step 308, the dimensioner apparatus 102 may include means, such as the processor 202, the image processing unit 210, and or the like, for determining whether the 3D point cloud includes the hole region. In some examples, the image processing unit 210 may be configured to analyze each of the plurality of pixels in the 3D point cloud to determine whether each of the plurality of pixels has the associated depth information. If the image processing unit 210 determines that a pixel does have associated depth information, the image processing unit 210 may be configured to classify the pixel as a depth pixel. If the image processing unit 210 determines that the pixel does not have associated depth information, the image processing unit 210 may be configured to classify the pixel as a hole pixel.

Figure 5:
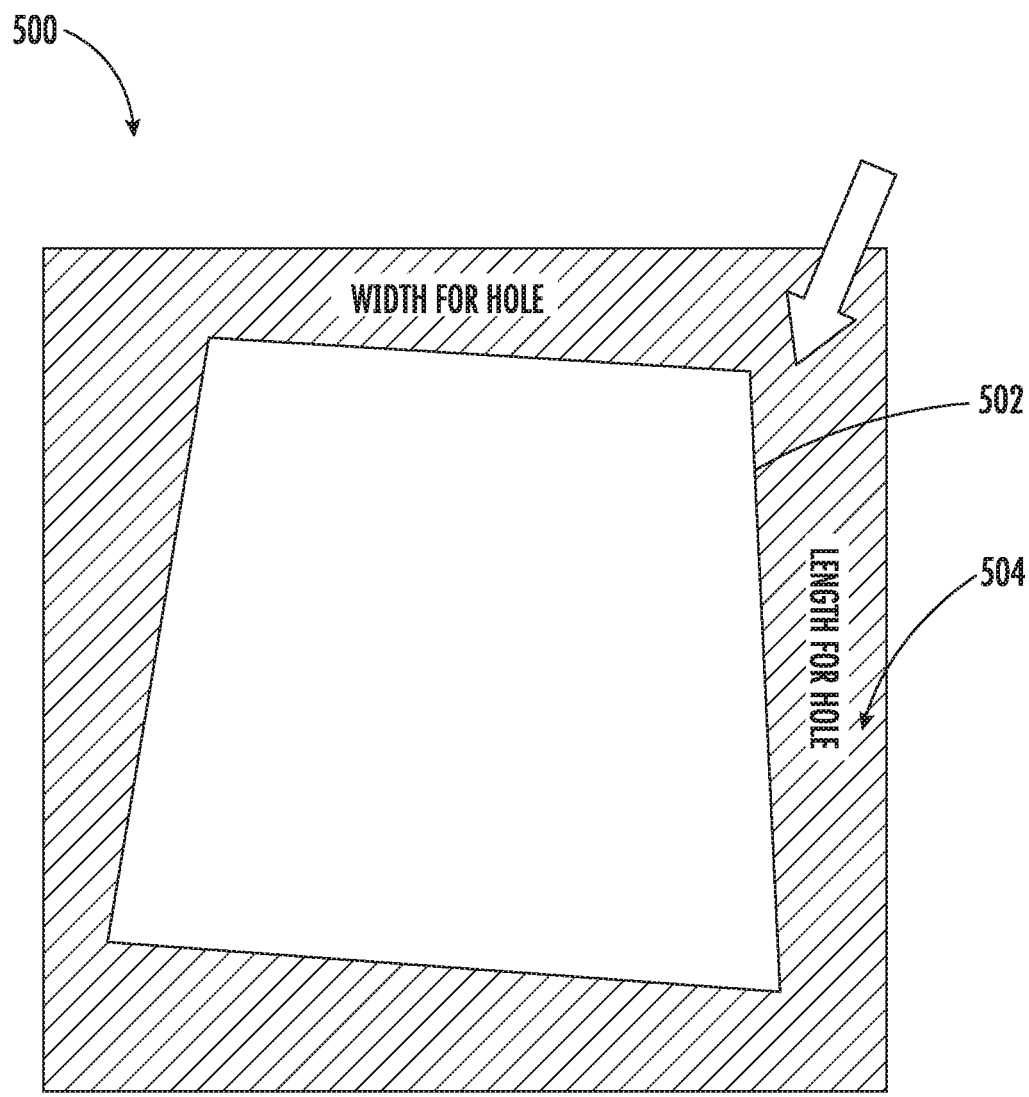
FIG. 5 illustrates an example image of a 3D point cloud, according to the one or more embodiments described herein.

After the classification of the plurality of pixels in the 3D point cloud, the image processing unit 210 may be configured to identify whether a portion in the 3D point cloud has a contiguous set of hole pixels. The image processing unit 210 may consider such region (having contiguous set of hole pixels) as the hole region. Referring to FIG. 5, an example 3D point cloud 500 having the hole region is illustrated, according to the one or more embodiments described herein. The 3D point cloud 500 includes a region 502 that does not include any 3D points. Because the region 502 is composed of a contiguous set of hole pixels, it corresponds to the hole region. Further, the 3D point cloud 500 includes a region 504 that has a contiguous set of depth pixels (represented as 3D points). Such region corresponds to a depth information region.

Referring back to FIG. 3, if at step 308, the image processing unit 210 determines that the 3D point cloud includes the hole region, the processor 202 may be configured to perform the step 310. However, if the image processing unit 210 determines that the 3D point cloud does not include the hole region, the processor 202 may be configured to perform the step 312.

At step 310, the dimensioner apparatus 102 may include means, such as processor 202, the image processing unit 210, the dimensioning unit 214, and or the like, for determining measurements of the one or more dimensions of the hole region. The determination of the measurements of the one or more dimensions of the hole region is described in conjunction with FIG. 6.

FIG. 6 illustrates a flowchart 600 of a method for determining the measurement of the one or more dimensions of the hole regions, according to one or more embodiments described herein.

At step 602, the dimensioner apparatus 102 includes means, such as the processor 202, the image processing unit 210, the dimensioning unit 214, and/or the like, for identifying one or more corners of the hole region. In an example embodiment, to determine the one or more corners of the hole region, the image processing unit 210 may be configured to determine one or more edges of the hole region using one or more edge detection techniques. In some examples, the one or more edges of the hole region may be representative of the periphery of the hole region. In some examples, the hole region is surrounded by the depth information region that includes the contiguous set of depth pixels (which are represented as 3D points), and the hole region includes the contiguous set of hole pixels (which are blackened out). Therefore, the one or more edges representing the periphery of the hole region also defines the periphery of the depth information region.

After determining the one or more edges of the hole region, the image processing unit 210 may be configured to identify a first set of 3D points along the periphery of the depth information region where the one or more edges of the hole region intersect. In some examples, the image processing unit 210 may determine the first set of 3D points as the one or more corners of the hole region.

At step 604, the dimensioner apparatus 102 includes means, such as the processor 202, the image processing unit 210, the dimensioning unit 214, and/or the like, for determining a count of 3D points between each pair of corners of the one or more corners of the hole region. For example, to determine the count of 3D points, the dimensioning unit 214 may be configured to determine a shortest line connecting the pair of corners. In some examples, the shortest line connecting the pair of corners may correspond to an edge of the hole region. Further, the shortest line may include a second set of 3D points. Thereafter, the dimensioning unit 214 may be configured to determine the count of the 3D points in the second set of 3D points, as the count of 3D points between the pair of corners. Similarly, the dimensioning unit 214 may be configured to determine the count of 3D points between other pair of corners of the one or more corners.

At step 606, the dimensioner apparatus 102 includes means, such as the processor 202, the image processing unit 210, the dimensioning unit 214, and/or the like, for determining the one or more dimensions of the hole region based on the count of the 3D points between each pair of corners of the hole region. In an example embodiment, a distance between two adjacent 3D points in the 3D point cloud is usually constant and is deterministic based on the height of the dimensioner apparatus 102 and the angle of the dimensioner apparatus 102 with stand 118 (i.e., the one or more dimensioner parameters). Therefore, based on the count of the 3D points between the pair of corners and the distance between two adjacent 3D points, the dimensioning unit 214 may be configured to determine the distance between the two corners. In an example embodiment, the distance between the pair of corners may correspond to a measurement of one of the one or more dimensions of the hole region. For example, the dimensioning unit 214 may be configured to determine the length of the hole region and the width of the hole region as the one or more dimensions of the hole region.

Referring back to FIG. 3, at step 314, the dimensioner apparatus 102 may include means, such as processor 202, the image processing unit 210, the dimensioning unit 214, and/or the like, for determining whether the measurement of the one or more dimensions of the hole region satisfy one or more dimension thresholds. In some examples, the dimensioning unit 214 may be configured to determine whether the measurements of the one or more dimensions of the hole region is equal to the one or more dimension thresholds, or within a toleration (e.g. +/−1 cm) of the one or more dimension thresholds. For example, the dimensioning unit 214 may determine whether the length and width of the hole region is equal to the length threshold and width threshold, respectively.

In some examples, the one or more dimension thresholds may correspond to actual dimensions of the object 116 (i.e. the structured light absorbing platform). For example, the one or more dimension thresholds may include the length, width, and height of the structured light absorbing platform. In some examples, the actual dimensions of the object 116 may have been determined offline using standard dimensioning techniques (e.g., measuring tape). Further, the actual dimensions of the object 116 may be pre-stored in the memory device 204 during the manufacturing of the dimensioner apparatus 102. In an alternative embodiment, the one or more dimension thresholds may be independent of the dimensions of the object 116 and may be pre-stored in the memory device 204 during the manufacturing of the dimensioner apparatus 102. For example, the one or more dimension thresholds includes a width threshold and a length threshold.

If the dimensioning unit 214 determines that the measurements of the one or more dimensions of the hole region are equal to or within a tolerance of the one or more dimension thresholds, the dimensioning unit 214 determine that the measurement of the one or more dimensions satisfy the one or more dimension thresholds. For example, if the dimensioning unit 214 determines that the length and the width of the hole region are equal to the length threshold and the width threshold, respectively, the dimensioning unit 214 may determine that the measurements of the one or more dimensions of the hole region satisfy the one or more dimension thresholds. Accordingly, the processor 202 may be configured to perform the step 316. If the dimensioning unit 214 determines that the measurements of the one or more dimensions of the hole region does not satisfy the one or more dimension thresholds, the processor 202 may be configured to perform the step 312.

At step 312, the dimensioner apparatus 102 may include means, such as processor 202, the image processing unit 210, the mode control unit 212, and/or the like, for configuring the dimensioner apparatus 102 in the 3D mode because the object 116 does not correspond to a structured light absorbing platform. Accordingly, the dimensioning unit 214 may determine the one or more dimensions using one or more 3-Dimensional dimensioning techniques. For example, the dimensioning unit 214 may be configured to determine one or more 3D planes that correspond to one or more surfaces of the object 116. Thereafter, the dimensioning unit 214 may be configured to determine one or more corners of the object 116 by identifying 3D points where the one or more 3D planes intersect. Based on the one or more identified corners, the dimensioning unit 214 may be configured to determine the one or more dimensions of the object 116 based on the count of 3D points between each pair of corners, as is described above in conjunction with step 606.

At step 316, the dimensioner apparatus 102 may include means, such as processor 202, the image processing unit 210, the mode control unit 212, and/or the like, for configuring the dimensioner apparatus 102 in the 2D mode. In the 2D mode, the dimensioner apparatus 102 may be capable of detecting and determining the one or more dimensions of the 2D object. For example, after configuring the dimensioner apparatus 102 in the 2D mode, the operator 122 may place a 2D object (such as an envelope or a piece of paper) on the object 116 (such as a structured light absorbing platform). Thereafter, the dimensioner apparatus 102 may identify the 2D object and may accordingly determine the one or more dimensions of the 2D object. The operation of the dimensioner apparatus 102 in the 2D mode is described in conjunction with FIG. 7.

FIG. 7 illustrates a flowchart 700 of a method for operating the dimensioner apparatus 102 in the 2D mode, according to one or more embodiments described herein.

At step 702, the dimensioner apparatus 102 may include means, such as the processor 202, the image processing unit 210, the dimensioning unit 214, and/or the like, for determining whether the 2D object is placed within the hole region. As discussed, the hole region in the first structured light image is due to presence of the object 116 (i.e., the structured light absorbing platform) in the field of view of the dimensioner apparatus 102. When the 2D object is placed on the structured light absorbing platform such as the object 116, the 2D object will reflect the structured light. Accordingly, when the input/output device interface unit 208 causes the first image capturing device 106 to capture a second structured light image, the second structured light image may include a first set of dots of the plurality of dots within the hole region. Further, when the image processing unit 210 generates the 3D point cloud from the second structured light image, the 3D point cloud may include the hole region (that does not include any 3D points) surrounded by the depth information region. Further, the 3D point cloud may include another depth information region, within the hole region, comprising a third set of 3D points that may be representative of the 2D object.

Figure 8:
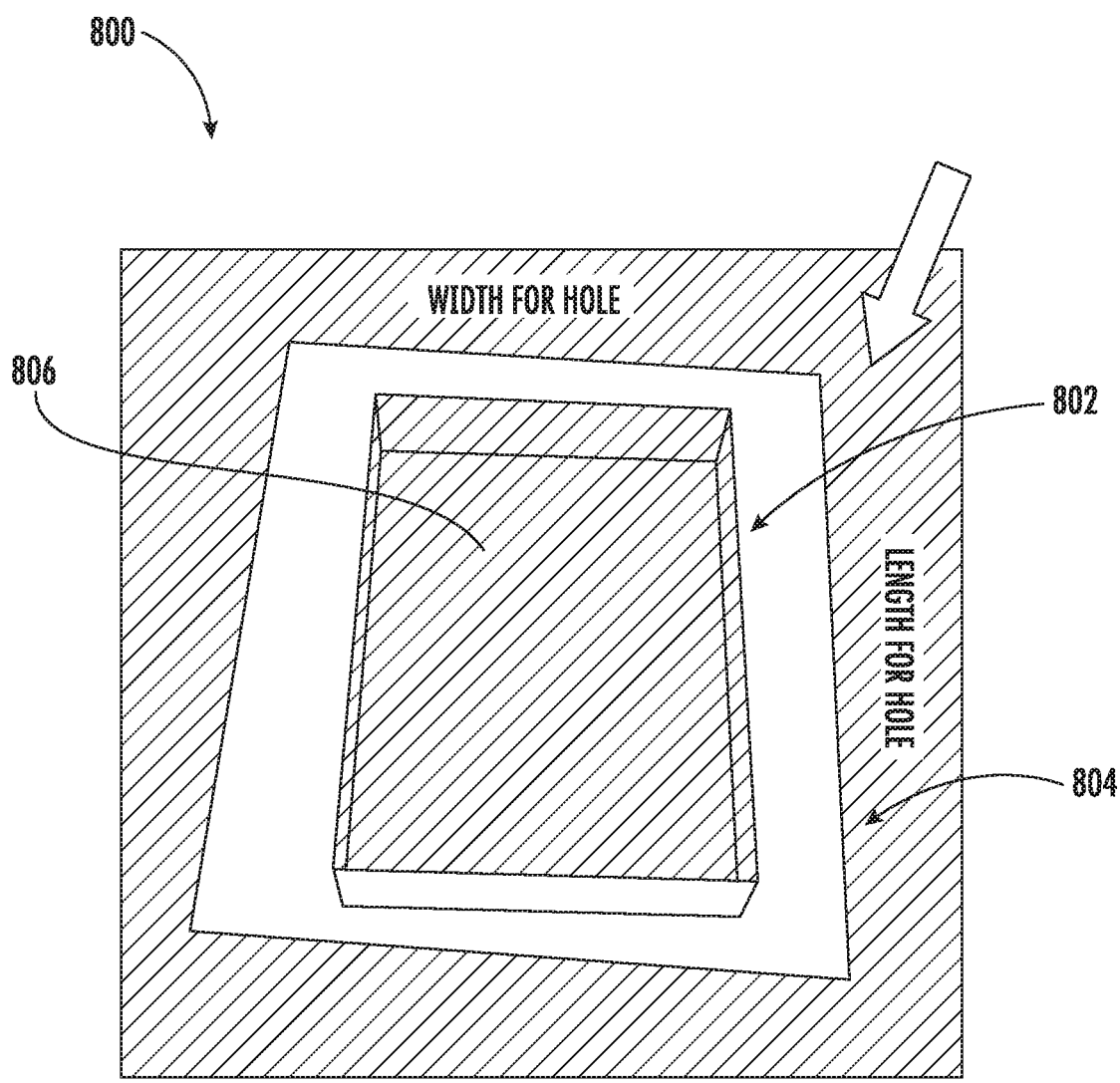
FIG. 8 illustrates another example image of a 3D point cloud, according to one or more embodiments described herein.

Because the third set of 3D points is surrounded by the hole region, the image processing unit 210 in the dimensioner apparatus 102 may be able to identify the periphery of the 2D object in the 3D point cloud. In some examples, for the image processing unit 210 to identify the 2D object in the 3D point cloud, the size of the 2D object is less than the size of the object 116 (on which the 2D object is placed). Referring to FIG. 8, an example 3D point cloud 800 is illustrated, according to one or more embodiments described herein. The 3D point cloud 800 depicts the hole region 802, which is surrounded by the depth information region 804. Further, the 3D point cloud depicts another depth information region 806 within the hole region. The other depth information region 806 represents the 2D object.

Referring back to FIG. 7, to determine whether the 2D object is placed on the object 116, the image processing unit 210 may be configured to identify a presence of the third set of 3D points within the hole region in the 3D point cloud. For example, the image processing unit 210 may analyze each of the pixels in the hole region to determine whether the pixel has the associated depth information. If a pixel in the hole region has the associated depth information, the image processing unit 210 may be configured to classify the pixel as the depth pixel. However, if the pixel does not have the associated depth information, the image processing unit 210 may be configured to classify the pixel as the hole pixel.

Thereafter, the image processing unit 210 may be configured to identify a region within the hole region that has a second contiguous set of depth pixels. In some examples, after identifying the region within the hole region, the image processing unit 210 may determine whether a count of depth pixels in the identified region (within the hole region) satisfy a pixel threshold value. In an example embodiment, the pixel threshold value may correspond to a minimum count of depth pixels that the identified region should have for the image processing unit 210 to identify the region to be representing the 2D object. If the image processing unit 210 determines that the count of depth pixels in the identified region satisfy the pixel threshold value, the image processing unit 210 determines that the identified region corresponds to the 2D object (i.e. the 2D object is placed on the structured light absorbing platform). Accordingly, the image processing unit 210 may be configured to perform the step 704. However, if the image processing unit 210 determines that the count of depth pixels does not satisfy the pixel threshold value, the image processing unit 210 may be configured to repeat the step 308 of FIG. 3.

At step 704, the dimensioner apparatus 102 may include means, such as the processor 202, the image processing unit 210, the dimensioning unit 214, and/or the like, for identifying one or more edges of the identified region (corresponding to the 2D object) within hole region. In some examples, the image processing unit 210 may utilize one or more edge detection algorithms for identifying the one or more edges of the region (corresponding to the 2D object) within the hole region.

At step 706, the dimensioner apparatus 102 may include means, such as the processor 202, the image processing unit 210, the dimensioning unit 214, and/or the like, for identifying a shape of the region (corresponding to the 2D object) within the hole region. In some examples, the image processing unit 210 may be configured to utilize algorithms such as, but are not limited to, scale invariant feature transform (SIFT), and speeded up robust features (SURF) to determine the shape of the 2D object based on the one or more identified edges. Some examples of the shape of the 2D object may include, but not limited to, a rectangle, a circle, and/or any other geometrical shape.

Subsequent to determining the shape of the region (corresponding to the 2D object) within the hole region, the dimensioner apparatus 102 may include means, such as the processor 202, the image processing unit 210, the dimensioning unit 214, and/or the like, for calculating the one or more dimensions of the 2-D object.

In some embodiments, the dimensioner apparatus 102 may calculate the dimensions of the 2-D object based on shape. In some embodiments, the shape is determined based on the depth pixels in the identified region. For example, as shown in step 708 of FIG. 7, the dimensioner apparatus 102 may include means, such as the processor 202, the image processing unit 210, the dimensioning unit 214, and/or the like, for determining whether the shape of the identified region corresponds to a rectangle or an irregular shape.

If the image processing unit 210 determines that the shape of the identified region, within the hole region, corresponds to the rectangle, the dimensioning unit 214 may be configured to perform the step 710.

At step 710, the dimensioner apparatus 102 may include means, such as the processor 202, the dimensioning unit 214, and/or the like, for identifying one or more corners of the rectangular region (depicting the 2D object in the 3D point cloud). To determine the one or more corners of the rectangle, the dimensioning unit 214 may be configured to identify a fourth set of 3D points in the identified region (depicting the 2D object in the 3D point cloud), where the one or more edges (identified by the image processing unit 210 in the step 704) intersect. Thereafter, the dimensioning unit 214 may consider the fourth set of 3D points as the one or more corners of the identified region (depicting the 2D object in the 3D point cloud).

At step 712, the dimensioner apparatus 102 may include means, such as the processor 202, the dimensioning unit 214, and/or the like, for determining a shortest line connecting each pair of corners of the one or more corners of the identified region (depicting the 2D object in the 3D point cloud). Further, the dimensioning unit 214 may be configured to determine a count of one or more 3D points lying on the line connecting each pair of corners of the one or more corners.

At step 714, the dimensioner apparatus 102 may include means, such as the processor 202, the dimensioning unit 214, and/or the like, for determining the one or more dimensions of the identified region within the hole region. In some examples, the dimensioning unit 214 may utilize methodologies as is described above in the step 606 to determine the dimensions of the identified region. For example, the dimensioning unit 214 may be configured to determine a distance between a pair of corners based on the count of the one or more 3D points between respective the pair of corners and the distance between the two adjacent 3D points. As discussed, the distance of the two adjacent 3D points may be determined based on the depth of each of the one or more 3D points. Because the third set of 3D points correspond to 2D object, the depth associated with each 3D point in the third set of 3D points is constant.

Further, the dimensioning unit 214 may be configured to determine the distance between the pair of corners as one of the dimensions of the region within the hole region. Because the region corresponds to a rectangular region, the distance between the pair of corners may correspond to either a length of the rectangular region or a width of the rectangular region. Further, because the rectangular region is representative of the 2D object, the one or more dimensions of the rectangular region correspond to the one or more dimensions of the 2D object.

If, at step 708, the image processing unit 210 determines that the shape of the region corresponds to the irregular shape, the image processing unit 210 may be configured to perform the step 716.

At step 716, the dimensioner apparatus 102 may include means, such as the processor 202, the dimensioning unit 214, and/or the like, for determining a minimum bounding box that encompasses the irregular shape. In an example embodiment, the dimensioning unit 214 may be configured to utilize various algorithms such as, but not limited to, convex hull, rotating calipers, and/or the like to determine the minimum bounding box that encompasses the irregular shape. In some examples, a shape of the minimum bounding box corresponds to a rectangle. Thereafter, at step 718, the dimensioner apparatus 102 may include means, such as the processor 202, the dimensioning unit 214, and/or the like, for determining one or more dimensions of the minimum bounding box. As discussed, the shape of the minimum bounding box is rectangle, the dimensioning unit 214 may be configured to determine the one or more dimensions of minimum bounding box using various geometrical relations such as, but not limited to, Pythagoras theorem. In an example embodiment, the dimensioning unit 214 may be configured to determine the one or more dimensions of the minimum bounding box as the one or more dimensions of the 2D object.

At step 720, the dimensioner apparatus 102 may include means, such as the processor 202, the communication interface 206, and/or the like, for transmitting to the one or more determined dimensions of the 2D object to the computing device, where the computing device may display the determined dimensions to the operator 122.

In some examples, the scope of the disclosure is not limited to the dimensioner apparatus 102 to capture separate structured light images (i.e., the first structured light image and the second structured light image) for detecting the hole region and detecting the 2D object within the hole region in the 3D point cloud. In an example embodiment, the dimensioner apparatus 102 may be configured to capture a single structured light image to detect both the hole region and the 2D object. In such an implementation, the input/output device interface unit 208 may cause the first image capturing device 106 to capture the first structured light image. Thereafter, the image processing unit 210 and dimensioning unit 214, and/or the like, may use methodologies described in the flowchart 300 to detect the hole region. Further, the dimensioning unit 214 and the image processing unit 210 may utilize the methodologies described in the flowchart 700 to determine the one or more dimensions of the 2D object.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art, the order of steps in some of the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for operating a dimensioner apparatus, the method comprising:
   causing, by a processor, a projector to project structured light in a field of view of the dimensioner apparatus;
   causing, by the processor, a first image capturing device to capture a first structured light image of the field of view of the dimensioner apparatus;
   analyzing, by the processor, the first structured light image to identify a hole region in the first structured light image, wherein the hole region in the first structured light image indicates a presence of a structured light absorbing platform in the field of view that absorbs the projected structured light;
   determining, by the processor, one or more dimensions of the hole region in the first structured light image;
   comparing, by the processor, the one or more determined dimensions of the hole region with at least one dimension threshold; and
   operating, by the processor, the dimensioner apparatus in a two-dimensional (2-D) mode based on the comparison, wherein the dimensioner apparatus in the 2-D mode is configured to determine one or more dimensions of a 2-D object placed on the structured light absorbing platform.

2. The method of claim 1, wherein the method further comprises determining a three-dimensional (3D) point cloud based on the first structured light image.

3. The method of claim 1, further comprising:
   receiving, by the processor, an input defining a reference plane in the field of view of the dimensioner apparatus; and
   determining, by the processor, one or more dimensioner parameters based on the reference plane.

4. The method of claim 3, wherein the one or more dimensioner parameters comprise a height of the dimensioner apparatus from the reference plane and an angle of the dimensioner apparatus with respect to a stand on which the dimensioner apparatus is mounted.

5. The method of claim 1, further comprising causing, by the processor, the first image capturing device to capture a second structured light image of the field of view, wherein the method further comprises determining, by the processor, a second 3D point cloud based on the second structured light image, wherein the second 3D point cloud is representative of the 2-D object placed on the structured light absorbing platform.

6. The method of claim 5, further comprising:
- identifying, by the processor, one or more 3D points from the second 3-D point cloud of the at least one 2-D object, wherein the one or more 3D points define a periphery of the 2-D object; and
- determining, by the processor, the one or more dimensions of the 2-D object based at least in part on a count of the one or more 3D points.

* * * * *